H. P. SUHL.
TRACTION ENGINE FOR CULTIVATORS.
APPLICATION FILED OCT. 4, 1911.
1,041,191.
Patented Oct. 15, 1912.
3 SHEETS—SHEET 1.
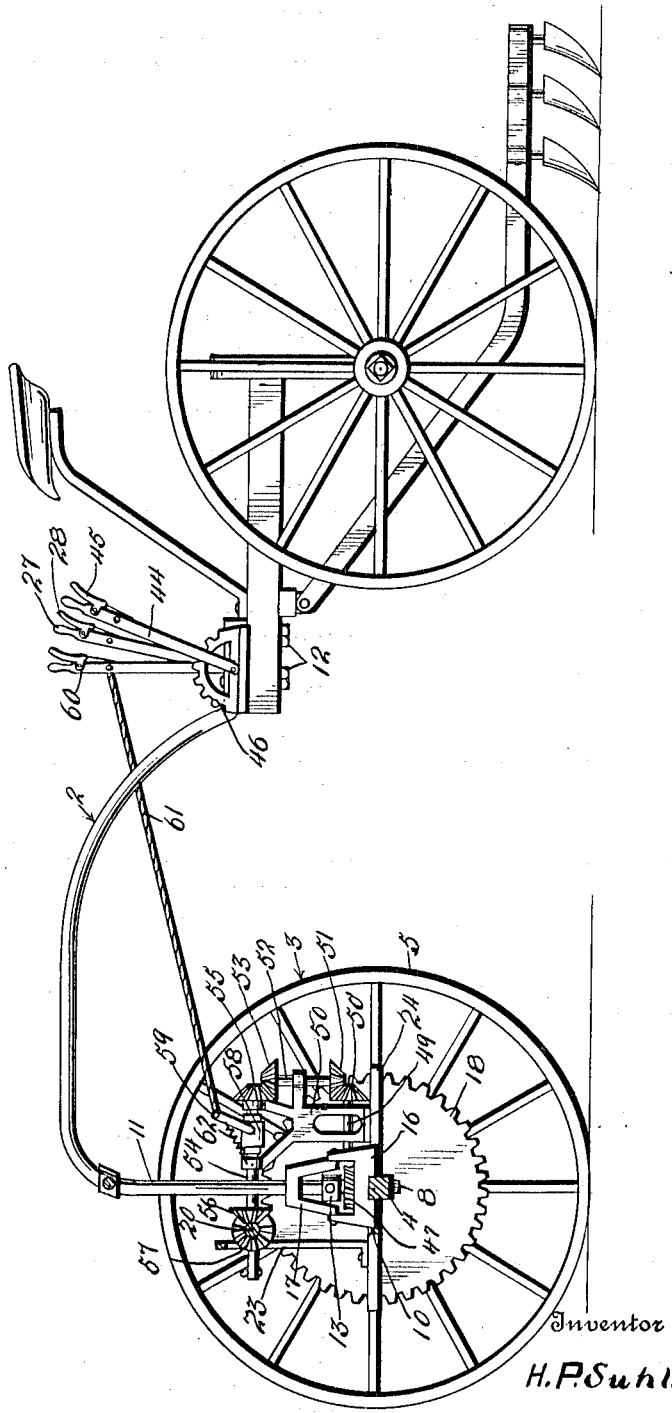

H. P. SUHL.
TRACTION ENGINE FOR CULTIVATORS.
APPLICATION FILED OCT. 4, 1911.
1,041,191.
Patented Oct. 15, 1912.
3 SHEETS—SHEET 2.
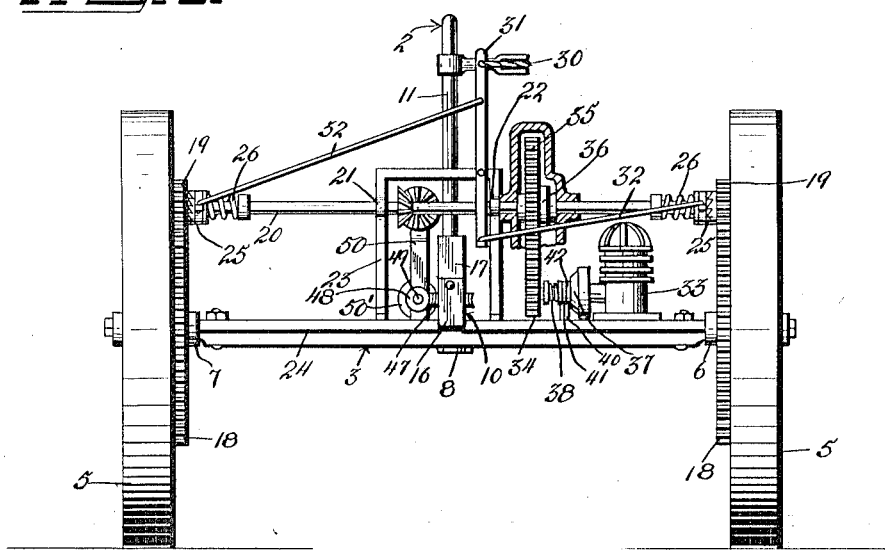
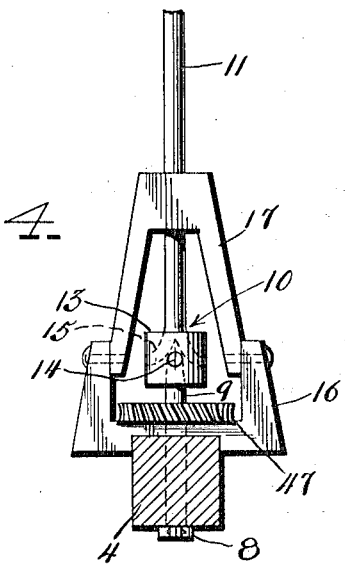

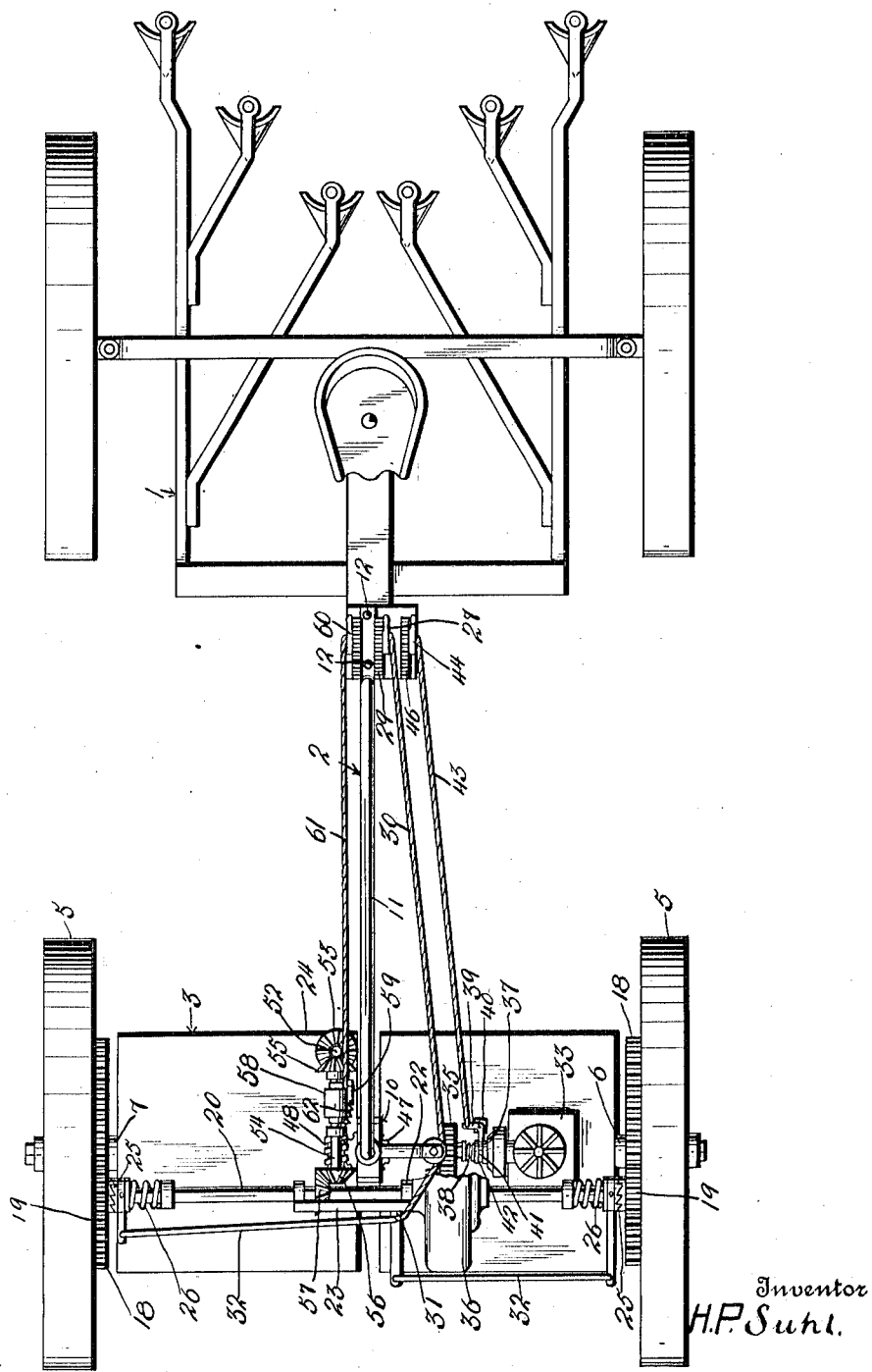

UNITED STATES PATENT OFFICE.

HERBERT P. SUHL, OF FORTUNA, MISSOURI.

TRACTION-ENGINE FOR CULTIVATORS.

1,041,191.  Specification of Letters Patent.  Patented Oct. 15, 1912.

Application filed October 4, 1911. Serial No. 652,724.

*To all whom it may concern:*

Be it known that I, HERBERT P. SUHL, a citizen of the United States, residing at Fortuna, in the county of Moniteau, State of Missouri, have invented certain new and useful Improvements in Traction-Engines for Cultivators; and I do hereby declare the following to be a full, clear, and exact description of the invention, such as will enable others skilled in the art to which it appertains to make and use the same.

This invention relates to new and useful improvements in motor vehicles, and more especially to motor vehicles for use in drawing cultivators, plows and other farm implements, and the object of my invention is to provide a motor propelled vehicle which may be readily attached to or detached from farm implements of the above described type.

A further object of my invention is to provide a device of the character described, so constructed that the entire operation of the engine and steering mechanism may be carried on from the seat of the cultivator or plow to which it is attached. And a still further object of my invention is to provide a motor driven traction device having but two wheels, namely the drive wheels, and having said wheels so arranged as to permit the turning of sharp corners which is necessary in drawing farm implements.

With these and other objects in view, my invention will be more fully described, illustrated in the accompanying drawings which illustrate a preferred embodiment of my invention as applied to a conventional form of cultivator, and then specifically pointed out in the claims which are attached to and form a part of this application.

In the accompanying drawings, Figure 1 is a side elevation of my device attached to a cultivator of conventional form. Fig. 2 is a front elevation of the same. Fig. 3 is a top plan view. Fig. 4 is a detail sectional view showing a peculiar form of hinge and swivel connection between the axle shaft of the traction engine and the draft beam thereof.

Referring more specifically to the drawings in which similar reference numerals designate corresponding parts throughout, 1 designates a conventional form of cultivator to which is secured by means of a draft beam 2 my improved draft attachment, which as a whole is designated by the numeral 3. As shown this draft attachment consists of an axle shaft 4 upon each end of which is rotatably mounted a ground wheel 5, said ground wheels being the drive wheels thereof, collars 6 and 7 being secured to the shaft one upon either side of each of said wheels to maintain the same in proper position thereon. Extending upwardly through the central portion of the shaft 4 and held against movement therethrough by the collar 8 is an upwardly extending stub shaft 9 and a hinge joint 10 connects the upper end of this shaft with one end of an arched draft beam 11, the other end of which is rigidly connected to the frame of the cultivator by means of bolts 12. This arched beam as shown is so proportioned as to permit the traction wheels 5 to cut under the same whereby the traction engine may be turned at a sharp angle.

The hinge joint 10 as best shown in Fig. 4 of the drawings consists of a collar 13 in opposite sides of which are rotatably journaled the trunnion ends 14 of the bifurcated upper terminal of the shaft 9 while the trunnioned ends 15 of the lower terminal of the draft beam 11 are also journaled in oppositely disposed apertures formed in the collar 13, the trunnions of the shaft 9 being located at an angle of ninety degrees from the trunnions of the draft beam, the two being thus hinged together. In order to strengthen and reinforce this hinge I have provided a second hinge consisting of a transversely extending U-shaped base member 16 apertured to pass over the stub shaft 9 and secured to the axle and hinged between the upwardly extending arms of this member by means of the pintle bolts are the downwardly extending arms of the second U-shaped member 17 which is apertured to pass over the downwardly extending forward end of the draft beam.

Firmly secured to and adapted to rotate with each of the drive wheels 5 is a gear 18, which as shown, meshes with gears 19 carried one upon either end of a horizontally disposed shaft 20 which is rotatably journaled in suitable bearings 21 and 22 carried by a frame 23 which is bolted or otherwise secured to a platform 24 which is mounted upon and secured to the axle shaft 4. The gears 19 are rotatably mounted upon the shaft 20 and adapted to be locked thereto and rotated therewith by means of the ratchet face clutches 25, said clutches being normally held in active position by means of the springs 26. As a means for throwing these clutches into inoperative position I have provided a hand lever 27 which is pivotally mounted at its lower end to the draft beam 11 at a point within easy reach of the operator in his seat and which is provided with a spring actuated pawl 28 adapted to engage with the ratchet segment 29. Connected by one end to this lever intermediate its length is a cable 30 the other end of which is connected to the upper end of a vertically extending lever 31 which is pivoted intermediate its length to the frame 23. Connecting rods 32 pivotally connect the clutches 25 with this lever at points equally distant above and below the pivotal point thereof. As will be readily understood rearward movement of the hand lever 27 will by means of the cable 30 and the lever 31 draw the clutches out of operative position while the pawl 28 will serve to maintain them in said position.

Firmly bolted or otherwise secured upon the platform 24 is an engine of any desired type, preferably an explosive engine, such as conventionally shown at 33, and keyed upon the shaft of this engine is a gear 34 which meshes with the master gear 35 of a differential or compensation gear mechanism shown conventionally at 36, this differential gear mechanism interrupting the continuity of the shaft 20 and thereby permitting independent rotation of the ground wheels 5 when swinging around a turn. Furthermore the shaft of the engine is equipped with a cone clutch shown conventionally at 37 said clutch being held in active position by means of a spring 38. For releasing the clutch a bell crank lever 39 is pivoted at its elbow to a standard 40 which is secured to the platform, one leg of the bell crank lever being connected to the loose ring 41 which fits in the peripheral groove of the sliding sleeve 42 of the clutch, the opposite leg of the bell crank lever being connected through the instrumentality of a cable 43 to an operating lever 44 which is pivotally connected at its lower end to the draft beam 11 at a point within convenient reach of the operator in his seat, and which is provided with a spring actuated pawl 45 adapted to engage with a ratchet segment 46. The spring 38 normally holds the cone clutch in active position, and by virtue of the lever 44, the clutch may be released when starting the engine, and may be then thrown into active position upon the engine attaining the desired speed.

As will be readily seen from the foregoing description the axle shaft 4 together with its platform 24 and the above described mechanism thereon, is free to revolve about the stub shaft 9 and as a means for revolving the same and so steering the machine I have provided a gear 47 which is rigidly fixed to the U-shaped hinge member 16 in any suitable manner, and this gear meshes with a worm gear 48 formed upon a shaft 49 which is ortatably mounted in the suitable bearing 50 carried by the platform 24. The free end of the shaft 49 is provided with a bevel gear 50' which meshes with a bevel gear 51 carried upon the lower end of a vertically extending shaft 52 which latter shaft is provided at its upper end with a bevel gear 53. A horizontally disposed shaft 54 is mounted in suitable bearings carried by the platform and is equipped at one end with a bevel gear 55 which meshes with the bevel gear 53, and is further equipped at its opposite end with a bevel gear 56 which meshes with a bevel gear 57 carried upon the shaft 20. The shaft 54 is provided with a reverse gear conventionally shown at 58, and having an operating lever 59. As a means for actuating the reverse gear I provide a pawl held operating lever 60 which is pivotally mounted adjacent the driver's seat and operatively connecting this lever with the lever of the reverse gear is a cable 61.

When the lever of the reverse gear is in a vertical position, the reverse gear is inactive and no motion is imparted to the gear 55. Upon actuating the hand lever 60 to move rearwardly the reverse gear lever 59, the reverse gear is thrown into operation and motion is transmitted from the drive shaft 20 to the worm gear 55, thus causing the device to turn in one direction. As a means for throwing the reverse gear in the opposite direction I have provided a spring 62 one end of which is connected to the lever 59 while its opposite end is connected to the stationary bearing 50, and as soon as the hand lever is released this spring will draw the lever 59 forwardly and cause the wheels to be turned in the opposite direction. It will be seen that the pawl of the hand lever 60 is a necessary part of the device in that it serves to normally lock the reverse gear in inoperative position. It is clear that when the reverse gear is in operative position that no turning of the wheels whatever may take place and that when the operator wishes to actuate the reverse gear he must release the pawl of the hand lever 60 and so actuate the lever as to maintain the cable 61 taut while at the same time permit the cable to conform to the turning movement of the wheels under the arched beam 11.

In operation the engine is started in the customary manner, the clutch 37 in the meanwhile being locked in inoperative position. The operator then assumes his position in the seat and throws the clutch into operative position thereby starting the machine. In turning a corner, the reverse gear hand lever 60 is so actuated that the gear 47 is rotated in the proper direction for turning the wheels in the desired direction. The driving shaft during swinging around of the wheels is preferably held against imparting movement to the wheels by releasing the clutches 25 through the instrumentality of the operating lever 27. By extending the steering and clutch operating mechanism to a point adjacent to the seat of the cultivator or other implement to which the traction machine above described is attached, it is possible for one man to operate both the traction machine and the cultivator, which is a great advantage over the customary form of traction engines for cultivators which have heretofore required the attention of at least two operators.

What is claimed, is:—

1. The combination of a wheeled axle, a stand shaft forming a pivot upon which said axle swings, a draft beam having an upright portion alining with said stand shaft, a hinge connection between said upright portion and said stand shaft, a gear loose on said stand shaft and fixed to said axle, a driving shaft, and an operative connection between said driving shaft and said gear.

2. The combination of a wheeled axle, a stand shaft forming a pivot upon which said axle swings and terminating at the upper end in gudgeons, a draft beam having an upright portion alining with said stand shaft and terminating at the lower end in gudgeons, a collar having orifices at ninety degrees apart journaling the gudgeons of said shaft and said draft beam, a gear loose on said stand shaft and fixed to said axle, a driving shaft, and an operative connection between said driving shaft and said gear.

3. The combination of a wheeled axle, a stand shaft engaged in and forming a pivot upon which said axle swings, a draft beam having an upright portion alining with said stand shaft, a hinge connection between said stand shaft and said upright portion, an upright yoke fixed to said axle, a depending yoke swivelly mounted on said upright portion, pivotal connections between the legs of both yokes, a gear loose on said stand shaft and fixed to said upright yoke, a driving shaft, and an operative connection between said driving shaft and said gear.

4. The combination of a dirigible truck, a stand shaft forming a pivot upon which said truck swings, a draft beam connected to said shaft, an engine on said truck, a driving shaft actuated by said engine, and means actuated by said driving shaft to swing the truck including a gear loose on said stand shaft and fixed to said truck, a reverse gear operatively connected to said driving shaft, and an operative connection between said driving shaft and the first named gear for actuating said gear in either direction.

In testimony whereof, I affix my signature, in presence of two witnesses.

HERBERT P. SUHL.

Witnesses:
L. L. LATHAM,
H. W. SCOTT.